United States Patent

[11] 3,627,890

| [72] | Inventors | Gunther Hermann<br>Leverkusen, Germany;<br>Peter Hoffmann, Hollywood, Calif.;<br>Friedrich-Karl Rosendahl, Leverkusen,<br>Germany; Ivar Ugi, Santa Monica, Calif. |
|------|-----------|-------|
| [21] | Appl. No. | 825,446 |
| [22] | Filed | May 16, 1969 |
| [45] | Patented | Dec. 14, 1971 |
| [73] | Assignee | Farbenfabriken Bayer Aktiengesellschaft<br>Leverkusen, Germany |
| [32] | Priority | May 10, 1968 |
| [33] | | Germany |
| [31] | | P 17 67 534.2 |

[54] COMPOSITIONS AND METHODS OF USING DITHIOBIURET COMPOUNDS FOR REPELLING BIRDS, RODENTS, LEPORINE ANIMALS AND RUMINANTS
12 Claims, No Drawings

[52] U.S. Cl. .................................................. 424/249
[51] Int. Cl. .................................................. A01n 9/00, A01n 9/22
[50] Field of Search.......................................... 424/249; 260/248 NS; 161/46 A

[56] References Cited
FOREIGN PATENTS
1,129,499 12/1961 Germany......................

OTHER REFERENCES
Ugi et al. (I) Liebigs Annalen der Chemie 670, 80– 82 (1963).
Ugi et al. (II) Chem. Abs. Vol. 56, 1962, page 7322
O' Brien et al. Chem. Abs. Vol. 59, 1963 page 13984

Primary Examiner—Albert T. Meyers
Assistant Examiner—Allen J. Robinson
Attorney—Burgess, Dinklage & Sprung

ABSTRACT: Compositions and methods of using certain dithiobiuret derivatives, some of which are known, which possess bird-, rodent-, leporine animal- and ruminant-repellent properties, and which may be produced by conventional methods.

COMPOSITIONS AND METHODS OF USING DITHIOBIURET COMPOUNDS FOR REPELLING BIRDS, RODENTS, LEPORINE ANIMALS AND RUMINANTS

The present invention relates to and has for its objects the provision for new active compositions of certain dithiobiuret derivatives, some of which are known, and which possess bird-, rodent-, leporine animal- and ruminant-repellent properties, in the form of mixtures of such compounds with inert solid dispersible carrier vehicles and/or inert liquid dispersible carrier vehicles containing a surface-active agent, and new methods for using such compounds especially for repelling warm-blooded creatures such as birds, rodents, leporine animals and ruminants, with other and further objects becoming apparent from a study of the within specification and accompanying examples.

It is already known that tetramethylthiouram disulfide (A) can be used for repelling rodents and ruminants. This active compound has attained a considerable significance in commercial practice.

It is also known that anthraquinone (B) can be used for repelling birds. This active compound has likewise attained a considerable importance in commercial practice, but exhibits no repellent effect on rodents, leporine animals and ruminants.

In this regard, the known members of the class of dithiobiuret derivatives to which the present invention relates, are not yet known to have any pesticidal or pest- or warm-blooded creature-repellent properties, but see the disclosure and claims regarding similar properties for analogous dithiobiuret derivatives in copending U.S. application Ser. No. 825,447, filed May 16, 1969 of the same inventorship herewith.

It has now been found, in accordance with the present invention, that certain dithiobiuret derivatives, i.e., the 1-alkyl- and 1-aryl-2,4-dithiono-1,2,3,4-tetrahydro-1,3,5-triazines, some of which are known, of the formula

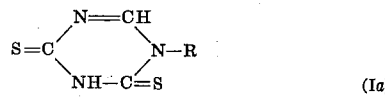

in which

R is alkyl of one to six carbon atoms, cycloalkyl of five to six carbon atoms, phenyl or substituted phenyl which is substituted with alkyl of one to four carbon atoms, exhibit a distinct repellent effect against birds, rodents, leporine animals and ruminants.

Surprisingly, the repellent effect of the active compounds of formula (Ia) above according to the present invention is higher than that of the known bird repellent anthraquinone (B) and the known rodent and ruminant repellent tetramethylthiouram disulfide (A). Therefore, the present invention represents a valuable contribution to the art.

The dithiobiuret derivatives of formula (Ia) above are already substantially known [cf. Liebigs Annalen der Chemie 670, 80–82 (1963) and German Pat. No. 1,129,499 Jan. 12, 1961)]. The still new dithiobiuret compounds of formula (Ia) above can be prepared suitable in the same manner as the known ones by addition of thiocyanic acid to isonitriles.

Advantageously, in accordance with the present invention, in the various formulas herein:

R represents alkyl hydrocarbon of one to six carbon atoms such as methyl, ethyl, n- and iso-propyl, n-, iso-, sec.- and tert.-butyl, n-amyl, 1-, 2- and 3-methyl-n-butyl, 1-ethyl-n-propyl, 1,1- and 1,2-dimethyl-n-/propyl, n-hexyl, iso-hexyl, and the like, especially $C_{1-5}$, $C_{1-4}$, $C_{2-5}$, $C_{2-4}$, $C_{3-4}$ $C_{2-6}$, $C_{3-5}$, $C_{3-6}$ and $C_{4-6}$ alkyl, more especially $C_{3-5}$ alkyl, and preferably n-butyl and tert.-butyl;

cycloalkyl of five to six carbon atoms such as cyclopentyl, cyclohexyl, and the like, especially cyclohexyl;

phenyl; or substituted phenyl which is substituted with alkyl of one to four carbon atoms such as methyl, ethyl, n- and iso-propyl, n-, iso-, sec.- and tert.-butyl substituted phenyl, especially mono and di methyl to tert.-butyl inclusive as defined above, and the like, substituted phenyl, especially mono and di $C_{1-3}$ or $C_{1-2}$ alkyl substituted phenyl, more especially di $C_{1-4}$ or $C_{1-3}$ or $C_{1-2}$ alkyl-phenyl, most especially 2,6-di $C_{1-4}$ or $C_{1-3}$ or $C_{1-2}$ alkyl-phenyl, and preferably 2,6-di-methyl-phenyl.

Advantageously, the active compounds according to the present invention possess, with low toxicity to warm blooded animals, a pronounced repellent effect against destructive birds such as anserine birds (*Anseriformes*), gallinaceous birds (*Galliformes*), charadriiform birds (*Charadiiformes*), cuculine birds (*Cuculiformes*), passerine birds (*Passeriformes*); and the like.

The anserine birds contemplated herein include essentially the geese (*Anseridae*), such as ducks (*Anatinae*), and the like, whereas the gallinaceous birds contemplated herein include, in particular, the true fowls (*Gallidae*), such as the ring-necked pheasant (*Phasianus colchicus*), and the like. Among the charadriiform birds contemplated herein, particularly important are the pigeons (*Columbae*), such as the wood pigeon (*Columba palumbus*) and the rock-dove (*Columba livia*) with its domestic varieties, and the like. In the case of the cuculine birds contemplated herein, the cuckoos (*Cuculi*), such as for example the plantain-eaters (*Musophagidae*), play a particular part, as do the parrots (*Psittaci*), for example the parakeets (*Psittacinae*), and the like. To the passerine birds contemplated herein there belong in the main, the ravens (*Corvidae*), such as the carrion crow (*Corvus corone*) and the rook (*Corvus frugilegus*), the starlings (*Sturnidae*), the American blackbirds (*Icteridae*), the finches (*Fringillidae*), such as the sparrows (*Passer spec.*), and the weaverbirds (*Ploceidae*), such as the red-billed weaver (*Quelea quelea*); and the like.

The compounds according to the present invention also exhibit a repellent effect against destructive leporine animals (*Lagomorpha*) and rodents (*Rodentia*), such as squirrellike animals (*Sciuroidae*), gophers (*Geomyoidae*) and animals of the mouse type (*Muroidae*) with which there are classed essentially the dormouselike animals (*Muscardinidae*) and the mice (*Muridae*); and the like.

The leporine animals contemplated herein include essentially the *Leporidae*, such as the rabbit (*Oryctolagus cuniculus*), the squirrellike animals include for example the European souslik (*Citellus citellus*) and the ground squirrel (*Citellus lateralis*), and the gophers include for example the mountain pocket gopher (*Thomomys talpoides*); and the like.

With the dormouselike animals contemplated herein there is classed for example the fat dormouse (*Glis glis*), and the like, whereas the mice contemplated herein comprise essentially, in the group of the long-tailed mice (*Murinae*), the rats (*Rattus spec.*), such as the black rat (*Rattus rattus*) and the Norway rat (*Rattus morvegicus*); the house mice (*Mus spec.*), such as *Mus musculus*; in the group of the hamsterlike animals (*Cricetinae*) the European hamster (*Cricetus cricetus*), and, in the group of the short-tailed mice (*Microtinae*), for example the common vole (*Microtus arvalis*), the field vole (*Microtus agrestis*) and the water vole (*Arvicola terrestris*); and the like.

The active compounds according to the present invention also repel destructive ruminants (*Ruminantia*), as the most important groups of which the deer (*Cervidae*) and the horned animals (*Bovidae*), and the like, are to be mentioned.

With the deer contemplated herein are classed for example the roe deer (*Capreolus capreolus*), the Virginia deer (*Odocoileus* spec.), the fallow deer (*Dama dama*), the wapiti (*Cervus canadensis*) and the red deer (*Cervus elaphus*), and the like. Among the horned animals contemplated herein, there belong to the group of the chamoislike animals (*Rupicaprinae*) particularly the sheep (*Ovis* spec.) and goats (*Capra* spec.), and the like.

The active compounds according to the instant invention can be utilized, if desired, in the form of the usual formulations or compositions with conventional inert pesticidal (or pest- or warm-blooded creature-repellent) diluents or extenders, i.e. conventional pesticidal (or pest- or warm-blooded creature-repellent) dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal (or pest- or warm-blooded creature-repellent) dispersible liquid diluent carrier and/or dispersible solid carriers optionally with the use of carrier vehicle assistants, e.g. conventional pesticidal (or pest- or warm-blooded creature-repellent) surface active agents, including emulsifying agents and/or dispersing agents, whereby, for example, in the case where water is used as diluent, organic solvents may be added as auxiliary solvents. The following may be chiefly considered for use as conventional carrier vehicles for this purpose; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as grouped natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other repellents, or nematocides, acaricides, insecticides, fungicides, herbicides, bactericides, etc., if desired, or in the form of particular dosage preparations for specific application made therefrom, such as solutions, emulsions, suspension, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.01–95 percent, preferably 0.05–80 percent, more preferably 0.1–40 percent, and most preferably 0.5–20 percent, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.01–95 percent, and preferably 0.01–80 percent, by weight of the mixture.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

In particular, the present invention contemplates methods of repelling warm-blooded creatures or animals, i.e. pests, and specifically birds, rodents, leporine animals and ruminants, which comprise applying to the area, material, place, and the like, from which such warm-blooded creatures are to be repelled, i.e. the locus to be protected or from which such creatures are to be repelled, a correspondingly repellent effective amount, i.e. a warm-blooded creature repellent effective amount, of the particular active compound of the invention alone or together with a carrier vehicle as noted above. The instant formulations or compositions are applied in the usual manner, for instance by spraying, atomizing, vaporizing, squirting, scattering, dusting, watering, sprinkling, pouring and the like.

More specifically, application of the active compounds according to the present invention, their formulations and the application forms prepared therefrom is effected in the normal way, e.g. by seed treatment, by spraying, dusting or scattering of suitable preparations of the active compound or plants or parts of plants jeopardized by bird and/or rodent damage and/or damage by ruminants (damage by game), by soil treatment, by fumigation in rooms or subterranean structures, by aboveground or underground application of repellent coatings and barriers and by impregnation of materials jeopardized by birds and/or rodents and/or ruminants, such as wood, paper, rubber and synthetic materials.

For seed treatment, e.g. seed dressing, in general substantially between about 0.01–5, preferably between about 0.025–1, parts by weight of active compound are used per 100 parts by weight of seed, e.g. per 100 g. of seed, i.e., plantable or agricultural crop seed.

Spray liquors or pastes for the achievement of bird-repellent, rodent-repellent and ruminant-repellent coatings, e.g. on jeopardized plants or parts of plants, contain, in general, substantially between about 0.1–20, preferably between about 0.5–10, percent by weight of active compound. Materials which are soaked with the active compounds should have in the surface layer thereof a concentration of active compound of substantially between about 0.1–5 percent by weight.

It will be realized, of course, that the concentration of the particular active compound utilized in admixture with the carrier vehicle may vary within a fairly wide range and will depend upon the intended application as the artisan will appreciate. Therefore, in special cases it is possible to go above or below the aforementioned concentration ranges.

The outstanding effectiveness of the particular compounds usable according to the present invention is illustrated, without limitation, by the following examples.

EXAMPLE 1

A. Repellent test/domestic pigeon
Test creature: domestic pigeon (*Columba livia*)
To prepare a suitable mixture of the particular active compound, 3 parts by weight of such active compound are mixed with 2.8 parts by weight of highly dispersed silicic acid and 4.3 parts by weight of talc. Six parts by weight of the resulting active compound concentrate are intimately mixed with 1000 parts by weight of wheat seed and the mixture, after addition of 11 parts by weight of polyethylene glycol as adhesive, is shaken until the seed is uniformly impregnated. The content of active compound is thus 0.18 percent.

One hundred twenty grams of the wheat so impregnated are placed in a plastic container provided with a circular aperture in the front wall. This container is placed in front of two feral pigeons kept together. No untreated food is available to the animals; they receive as much water as they wish. The experiment proceeds for 60 hours under continuous light.

The residual amount of treated seed is weighed again after the experiment. It is expressed as a percentage of the amount originally used, and this figure is valid as a measure of the repellent effect. Thus 100 percent means that no wheat is eaten, the repellent effect being consequently total.

The particular active compounds tested, the repellent effect and the number of individual experiments can be seen from the first three columns of the following table 1:

B. Repellent test/house mouse
Test creature: white laboratory mouse (*Mus musculus*)
Concentration of active compound in test food: 0.5 percent.

To produce a suitable preparation of the particular active compound, 3 parts by weight of such active compound are mixed with 2.8 parts by weight of highly dispersed silicic acid and 4.2 parts by weight of talc. To prepare the test bait, 1.67 parts by weight of the resulting active compound concentrate are intimately mixed with 95 parts by weight of a mealy standard food customary for maintaining experimental animals, with the addition of 3.33 parts by weight of methyl cellulose and a little water. From 6 g. of the resulting dry substance, two spherical bait pellets are formed which are dried at room temperature for 24 hours before commencement of the experiment.

The pellets are placed for 24 hours, without other food, before two white laboratory mice kept together. Water is freely available. The residues of the pellets are dried and weighed again after the experiment has ended.

The residual amount, expressed as a percentage of the amount originally used, is valid as a measure of the repellent effect. Thus, 100 percent repellent effect means that nothing at all of the pellets has been eaten.

The particular active compounds tested, the number of experiments and the results obtained can be seen from the first, fourth and fifth columns of the following table 1:

TABLE 1

| | | Repellent test | | | |
|---|---|---|---|---|---|
| | | Domestic pigeon | | House mouse | |
| | Active compound | Number of individual experiments | Repellent effect in percent [1] | Number of individual experiments | Repellent effect in percent [1] |
| (A) | Tetramethylthiouram disulfide (known) | 3 | 49.7 | 2 | 60.0 |
| (B) | Anthraquinone (known) | 2 | 47.4 | 3 | 0 |
| (1a1) | S-C(=N-)(NH-)(C=S)-N-(CH₂)₃-CH₃ | 1 | 82.5 | 2 | 84.2 |
| (2a1) | S=C(N=)(NH-)(C=S)-N-C(CH₃)₃ | 1 | 63.3 | 3 | 92.8 |
| (3a1) | S-C(=N-)(NH-)(C=S)-N-C₆H₅ | 1 | 70.8 | 3 | 83.9 |
| (4a1) | S-C(=N-)(NH-)(C=S)-N(CH₂)-C₆H₅ | 2 | 79.9 | 3 | 87.2 |
| (5a1) | S-C(=N-)(NH-)(C=S)-N-(2,6-dimethylphenyl) | | | 1 | 73.3 |

[1] Average value.

EXAMPLE 2

Open-air enclosure test/black-tailed deer
Test creature: Black-tailed deer (*Odocoileus columbianus*)

To produce a suitable preparation of the particular active compound, 6 parts by weight of such active compound and 10 parts by weight of a copolymer of methacrylic acid methyl ester and butadiene as adhesion promoter are dispersed in 84 parts by weight of water. Two-year-old Douglas fir seedlings (*Pseudotsuga taxifolia*) 18–30 cm. high are totally immersed in the active compound preparation. After drying, the plants are covered all over with a thin layer of the adhesive containing active compound and planted in a game enclosure of 1.01 hectares. Inside the enclosed open-air area, 10 test plots are laid out in each of which there are 10 seedlings which are treated with the given active compound, 10 seedlings which are treated with the standard agent tetramethylthiouram disulfide (TMTD) and 10 seedlings which are untreated and which serve as control.

The game enclosure is then occupied by 10 black-tailed deer. The test proceeds until intermediate checks show a damage of 60–80 percent in the case of the untreated seedlings. Then the average degree of damage is determined. One hundred means that all the seedlings have been damaged, whereas 0 means that none of the seedlings have been damaged.

The particular active compounds tested, dosages, number of treated seedlings and average degrees of damage can be seen from the following table 2.

TABLE 2

[Enclosed open-air area test/black-tailed deer]

| Active compound | Dosage of active compound in the treatment medium in percent | Number of treated seedlings | Average degree of damage |
|---|---|---|---|
| (A) Tetramethylthiouram disulfide (known) | 6 | 100 | 52.52 |
| Untreated control | | 100 | 70.35 |
| (3a₂) 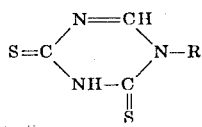 | 6 | 100 | 17.14 |

It will be realized that all of the foregoing compounds contemplated by the present invention possess the desired warm-blooded creature or animal repellent properties for repelling birds, rodents, leporine animals and ruminants, and that such compounds have not only a very slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention.

What is claimed is:

1. A composition for repelling birds, rodents, leporine animals and ruminants which comprises a mixture of a solid carrier and creature repellent effective amount, constituting substantially between about 0.01–95 percent by weight of the mixture of a dithiobiuret compound of the formula:

$$S=C\begin{matrix}N=CH\\ \\NH-C\end{matrix}N-R$$
$$\phantom{S=C\ NH-}\|\phantom{N-R}$$
$$\phantom{S=C\ NH-}S$$

in which R is selected from the group consisting of alkyl of one to six carbon atoms, cycloalkyl of five to six carbon atoms, phenyl and substituted phenyl which is substituted with alkyl of one to four carbon atoms.

2. A method for repelling warm-blooded creatures selected from the group consisting of birds, rodents, leporine animals and ruminants, which comprises applying to the locus from which said warm-blooded creatures are to be repelled, an effective amount for repelling said creatures of a compound of the formula $$S=C\begin{matrix}N=CH\\ \\NH-C\end{matrix}N-R$$
$$\phantom{S=C\ NH-}\|$$
$$\phantom{S=C\ NH-}S$$

in which R is selected from the group consisting of alkyl of one to six carbon atoms, cycloaklyl of five to six carbon atoms, phenyl and substituted phenyl which is substituted with alkyl of one to four carbon atoms.

3. The method according to claim 2 wherein R is selected from the group consisting of $C_{3-5}$ alkyl, $C_{5-6}$ cycloalkyl, phenyl and di-$C_{1-4}$ alkyl-phenyl.

4. The method according to claim 2 wherein R is selected from the group consisting of $C_{3-5}$ alkyl, cyclohexyl, phenyl and di-$C_{1-2}$ alkyl-phenyl.

5. The method according to claim 2 wherein R is selected from the group consisting of $C_{3-5}$ alkyl, cyclohexyl, phenyl and 2,6-di-$C_{1-2}$ alkyl-phenyl.

6. The method according to claim 2 wherein R is selected from the group consisting of n-butyl, tert.-butyl, cyclohexyl, and 2,6-dimethyl-phenyl.

7. The method according to claim 2 wherein such compound is

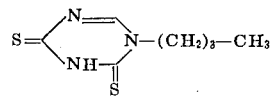

8. The method according to claim 2 wherein such compound is

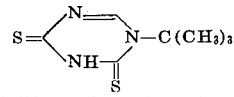

9. The method according to claim 2 wherein such compound is

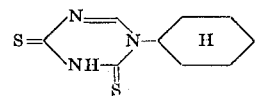

10. The method according to claim 2 wherein such compound is

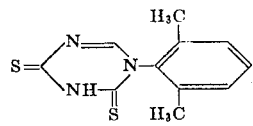

11. The method according to claim 13 wherein said locus is seed and said compound is applied as a dressing in an amount of substantially between about 0.01–5 parts by weight per 100 parts by weight of seed.

12. A method for repelling warm-blooded creatures selected from the group consisting of birds, rodents, leporine animals and ruminants which comprises applying to the locus from which said warm-blooded creatures are to be repelled an effective amount for repelling said creatures of a compound of the formula:

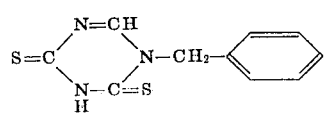

* * * * *